Feb. 28, 1956     D. JOHNSTON     2,736,279
SEALER ATTACHMENT FOR ANHYDROUS AMMONIA APPLICATOR
Filed Sept. 17, 1951     2 Sheets-Sheet 1
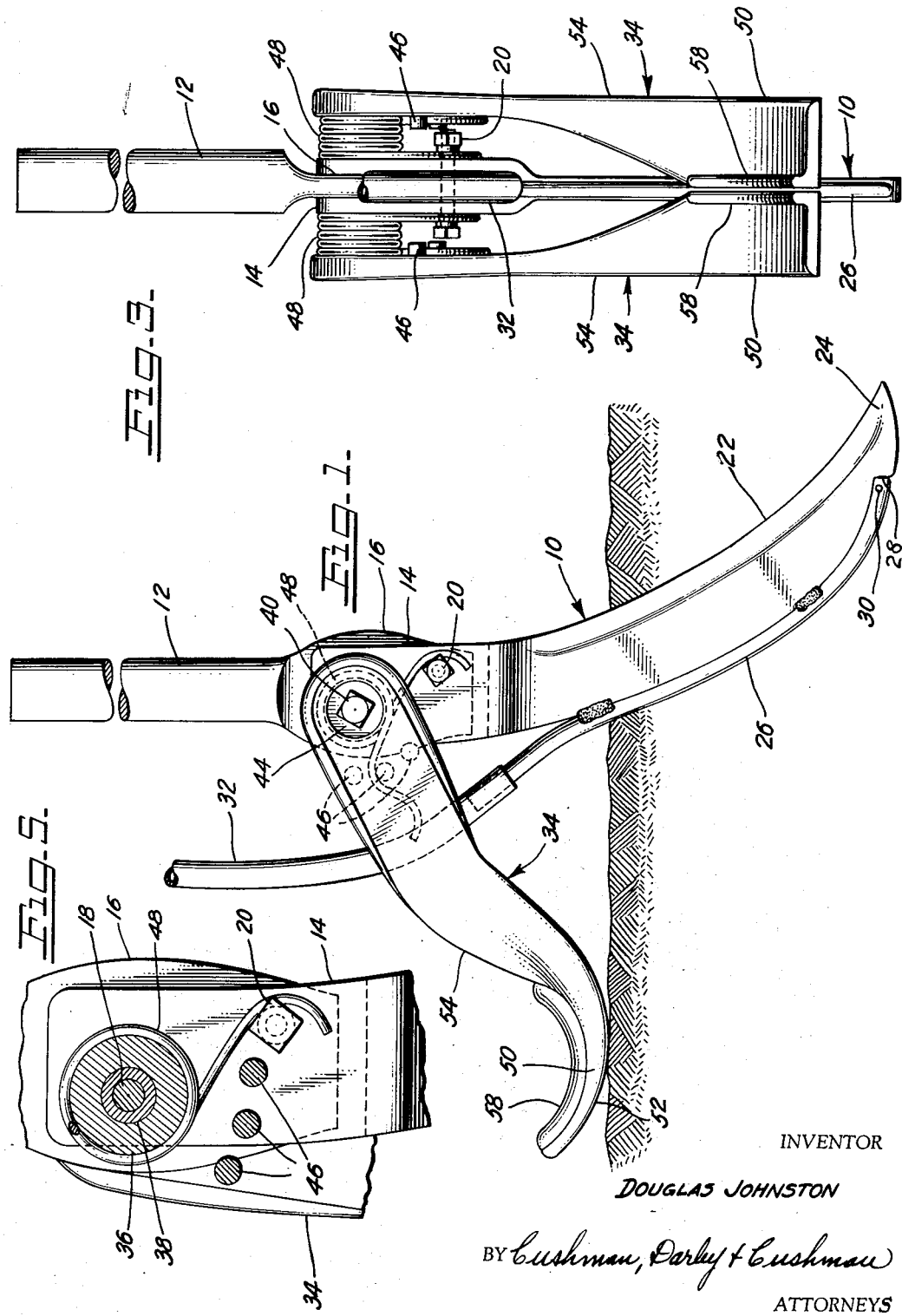
INVENTOR
DOUGLAS JOHNSTON
BY Cushman, Darby & Cushman
ATTORNEYS

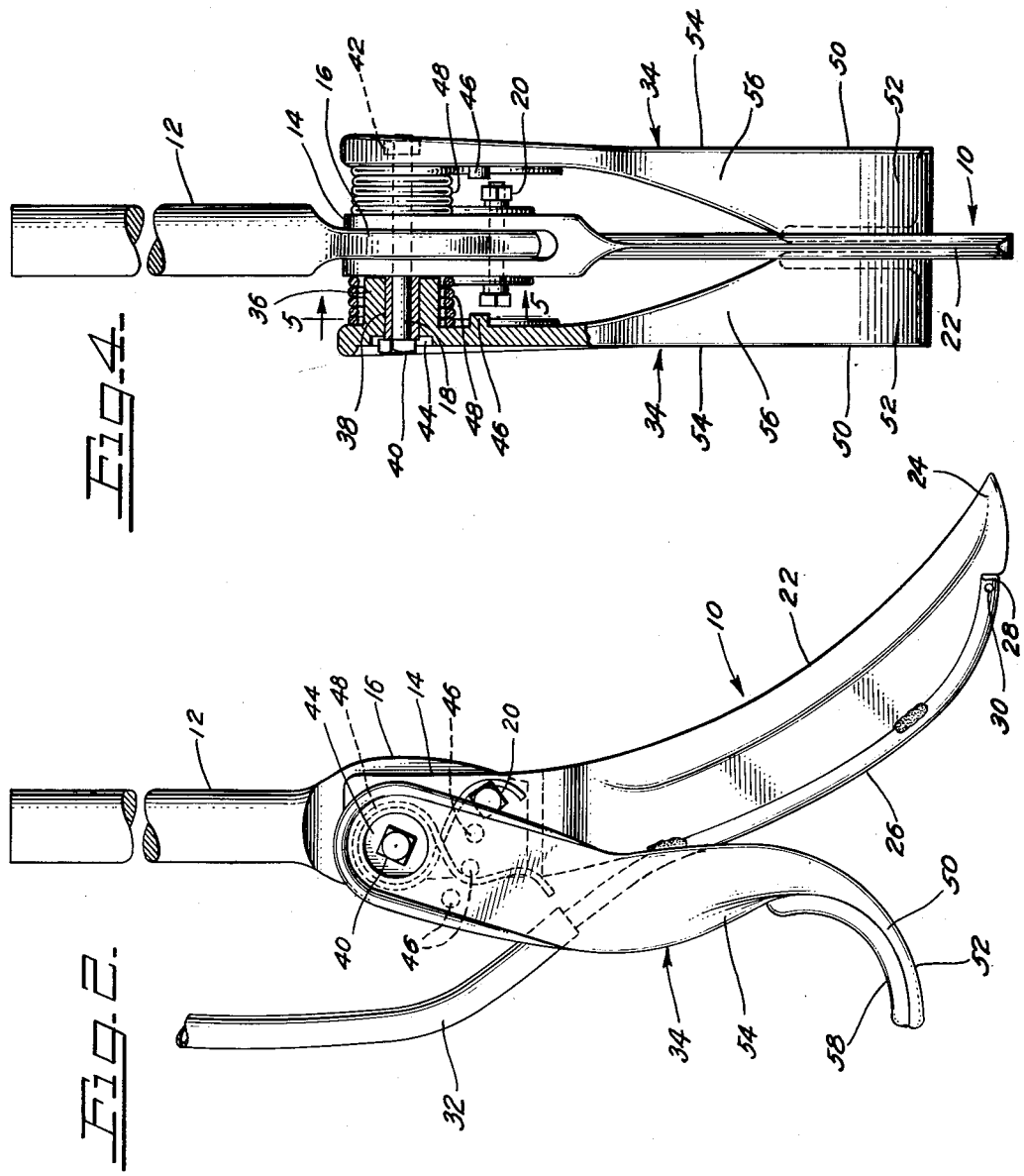

United States Patent Office 2,736,279
Patented Feb. 28, 1956

2,736,279

SEALER ATTACHMENT FOR ANHYDROUS AMMONIA APPLICATOR

Douglas Johnston, Huntsville, Ala., assignor to John Blue Company, Huntsville, Ala., a corporation of Alabama Application September 17, 1951, Serial No. 246,946

5 Claims. (Cl. 111—7)

This invention relates to agricultural implements and more particularly to fertilizer distributors for applying a pressurized normally-gaseous liquid into the ground.

Fertilizer distributors of the type under consideration comprise cultivator-type implements having one or more thin cultivator-like teeth or blades which are drawn through the soil. Each blade is provided with a tube, usually extending down the rearward edge thereof, for conducting liquid fertilizer, more specifically anhydrous ammonia, to the lower end of the blade for escape through suitable discharge ports into the adjacent soil. Such blades are usually provided with a supporting shank that is secured to a lift-type cultivator drawbar.

The liquid anhydrous ammonia so applied into the ground is normally maintained under pressure, so that upon release of such pressure during application, a large portion of the applied anhydrous ammonia reverts to a vaporous state. This is particularly true in view of the fact that soil, at the time of year when fertilizer normally is applied, is fairly warm, and thereby tends to rather rapidly convert the applied liquid anhydrous ammonia from a liquid into a gaseous state. Anhydrous ammonia is readily absorbable into the earth in either its liquid or gaseous form. It is desirable, however, that the discharge ports of the feed tube do not have direct or substantially direct communication with the atmosphere, since in such event the gaseous portions of the applied anhydrous ammonia will readily escape into the atmosphere, and thereby dissipate, without being absorbed in the ground.

The applicator blades of implements of the type under consideration, because of their narrow width, leave only a relatively narrow furrow behind the travelling blade. Hence, the quantity of anhydrous ammonia which escapes upwardly through the loose earth behind the blade is not very large. It has been found in actual practice, however, that a sufficient quantity of gaseous anhydrous ammonia does escape from the earth behind the travelling blade to make it desirable to provide some means for preventing such escape and consequent dissipation without absorption into the ground. Obviously, a gas will not travel very rapidly through packed earth and, therefore, if the earth in the furrow behind the travelling applicator blade is packed down as rapidly as such furrow is formed, the escape of anhydrous ammonia and dissipation into the air without absorption into the soil will be reduced to a minimum. In other words the gas will be sealed in the soil for subsequent absorption thereby.

It is, therefore, an object of this invention to provide fertilizer distributors of the type under consideration with means for packing the earth in the furrow immediately behind the travelling blade as rapidly as such furrow is formed in order to inhibit the upward escape and consequent loss of gaseous anhydrous ammonia into the atmosphere.

It is another object of this invention to provide a sealer attachment for conventional anhydrous ammonia applicator blades for minimizing the escape of gaseous anhydrous ammonia from the soil before absorption thereby.

It is still another object of this invention to provide a sealer attachment of the type under consideration which will not be damaged by an encounter with an obstruction during the course of forward movement of the applicator blade or tooth.

It is a further object of this invention to provide simple, and consequently inexpensive, means for accomplishing the above objects.

Other objects and advantages of this invention will be apparent from the following description and accompanying drawings, in which:

Figure 1 is a side elevational view illustrating an anhydrous ammonia applicator blade provided with a sealer attachment embodying this invention. The applicator blade is shown in operative position within the ground and with the sealer atachment assuming its normal position of operation in the furrow behind the travelling blade.

Figure 2 is a side elevational view of the applicator blade and sealer attachment illustrated in Figure 1, but showing the normal position of the sealer attachment when the applicator blade is withdrawn from the ground.

Figure 3 is a rear elevational view of the device shown in Figure 2.

Figure 4 is a front elevational view of the device shown in Figure 2, parts being shown in section in order to illustrate details more clearly.

Figure 5 is an enlarged fragmentary sectional view taken on line 5—5 of Figure 4.

Referring now to the drawings, there is shown in Figure 1 an anhydrous ammonia applicator tooth or blade 10 provided with a supporting shank 12 that is adapted to be secured to a lift-type cultivator drawbar (not shown). The upper end of the applicator blade 10 is provided with a bifurcated portion 14 with the flattened lower end 16 of the supporting shank 12 received therein and secured thereto by two spaced transverse bolts 18 and 20. Preferably, the lower bolt 20 is of a diameter sufficiently smaller than that of the upper bolt 18 to permit the bolt 20 to shear, upon the travelling blade 10 encountering an obstruction beneath the surface of the ground, and permit the blade to pivot rearwardly about the upper bolt 18 in order to avoid damage to the blade. The blade 10 below the bifurcated portion 14 is reduced transversely and has a sharpened forward edge 22 that extends in a smooth concave curve downwardly and forwardly and terminates in a pointed foot 24.

Secured to the rear edge of the blade 10, as by welding, is a metal tube 26 which extends downwardly along such edge and terminates within an upwardly offset portion 28 of the blade immediately behind the pointed foot portion 24. The lower end of the tube 26 is provided with lateral ports 30 for the discharge of anhydrous ammonia into the soil immediately to the rear of the foot portion 28 of the blade 10. Anhydrous ammonia is conducted from an appropriate source of supply (not shown) to the upper end of the tube 26 by means of a flexible conduit 32 which may be tightly telescoped over the upper end of the tube for connection thereto.

The afore-described construction is somewhat conventional and it is believed that no further detailed description thereof is necessary. It will be seen that during forward movement of the blade 10 through the soil anhydrous ammonia is continuously applied beneath the surface of the ground. Movement of the blade 10 through the soil creates a furrow therebehind which, because of the narrowness of the blade, is rather rapidly partially filled in by soil falling back thereinto after passage of the travelling blade. There remains, however, a rather low ridge on each side of the furrow and additionally the earth within such furrow is in a rather loose, that is, unpacked, condition. Hence, some of the vaporized portions of the applied anhydrous ammonia will escape upwardly through such unpacked earth in the furrow and escape from the surface of the ground to be lost by dissipation into the atmosphere.

The means for inhibiting the aforementioned upward escape of the gaseous portions of the applied anhydrous ammonia comprises a pair of arms 34, each having an inwardly extending apertured boss 36, at one end thereof, pivotally mounted on an extended portion of the upper bolt 18. Preferably, a bushing 38 is interposed between the bearing aperture of each arm 34 and the bolt 18, such bushing being slightly longer than the length of such bearing aperture. Hence, when the bolt 18 is tightened it bears only against the outer ends of the bushings 38 so that the arms 34 will pivot freely on their respective bushings without binding. The head 40 and the nut 42 of the bolt 18 preferably are inset into counterbores 44 in their respective arms 34 in order to eliminate trash-collecting projections as much as possible. Each arm 34 is provided with a series of spaced inwardly-directed lugs 46 arranged in an arcuate path about the center of the bearing aperture. Mounted on the boss 36 of each arm is a coil spring 48 having one end thereof engaged over an extension of the lower bolt 20 and the other end thereof engaged with one of the lugs 46, so that the spring 48 tends to urge the arm 34 downwardly, that is counter-clockwise, as shown in Figures 1 and 2. It will be seen that by shifting the engagement of the said other end of the spring 48 to various of the lugs 46, the spring force urging the arm 34 downwardly can be varied.

Each arm 34 is substantially rectangular in cross section, of greater width than thickness, and extends rearwardly and downwardly for engagement with the surface of the ground behind the blade 10 when the latter is operative. Intermediate its ends, each arm 34 is helically twisted through about 90° to provide a trailing portion 50 that has a longitudinally convex undersurface 52 for engagement with the ground. By reason of this construction, the intermediate section 54 of each blade 34 has an inclined helically curved inner surface 56 (Figure 4) that engages the ridged earth on each side of the furrow and sweeps or pulls the same back into the furrow. Thereupon the flat undersurface 50 of the blade 10, forcibly urged into engagement with the earth by the springs 48, rather tightly packs the returned earth into the furrow. Such packing obviously will inhibit the upward escape of anhydrous ammonia from beneath the surface of the ground. It will be noted that the opposed inner edges of the trailing portions 50 of the arms 34 are closely spaced, as shown best in Figures 3 and 4, to thereby pack the earth throughout substantially the full width of the furrow behind the travelling blade 10. Since the trailing portions 50 of the blades are somewhat longitudinally convex, i. e., turn upwardly at their ends, as shown in Figures 1 and 2, for added strength each portion 50 is provided with a strengthening rib 58 extending longitudinally along its upper surface adjacent its inner edge.

The spring-biased mounting of the arms 34, in addition to providing the aforementioned sealing effect by reason of their soil packing action, provides means for preventing damage thereto upon an encounter with an obstruction, such as a rock, on the ground. It will be obvious that should such an obstruction be encountered by one of the arms 34, the same will pivot rearwardly and upwardly to ride over such obstruction and immediately resume the desired sealing effect after the obstruction has been passed. The use of two individually spring-biased arms 34, instead of a single arm riding the furrow behind the travelling blade 10, provides still another advantage in that should an obstruction be encountered on one side of the travelling blade 10, the corresponding sealing arm 34 will rise, while the opposite arm 34 continues its sealing effect. Obviously, such would not be the case should a single wide arm be used because encountering an obstruction by either side of such single arm would raise the entire arm and thereby lose all sealing effect until the obstruction had been passed. In this same connection, it is pointed out that the mounting of the spring 48 renders the arms 34 substantially self-cleaning of any trash collected thereby.

It will also be seen that the sealing attachment, that is, the arms 34 and their springs 48, is adapted to be attached on a conventional anhydrous ammonia applicator implement merely by the substitution of a lengthened bolt 18 for the short bolt (not shown) used for securing the blade 10 to the flattened portion 16 of its supporting shank 12.

It will thus be seen that the objects of this invention have been fully and effectively accomplished. It will be realized, however, that the specific embodiment shown to illustrate this invention is susceptible of various changes which still retain the principle of this invention. Therefore, this invention includes all embodiments which are encompassed by the spirit and scope of the following claims.

I claim:

1. In fertilizing apparatus for applying a normally-gaseous pressurized liquid into the ground, the combination comprising: a thin soil-penetrating blade; conduit means associated with said blade for conducting a normally-gaseous pressurized liquid to the soil-embedded end of said blade for escape into and absorption by the soil; a pivot pin extending transversely through the above-ground end of said blade; a pair of arms pivotally mounted on said pin on opposite sides of said blade and having trailing portions for riding the surface of the soil behind said blade and covering the furrow formed thereby, said portions having opposed edges disposed in planes substantially parallel to and on opposite sides of the plane of said blade and spaced apart a distance less than the width of said blade, each of said arms comprising an elongated plate-like member having a gradual 90° helical twist intermediate its length, one end of said member being mounted on said pivot pin flatwise against said blade and the trailing porton of said member beng longitudinally curved to provide a convex undersurface; and a pair of coil springs mounted on said pin on opposite sides of said blade and engaging the latter and said arms for individually urging said arms into engagement with the soil.

2. In fertilizing apparatus for applying a normally-gaseous pressurized liquid into the groung, the combination comprising: a thin soil-penetrating blade; conduit means associated with said blade for conducting a normally-gaseous pressurized liquid to the soil-embedded end of said blade for escape into and absorption by the soil; a blade-supporting shank, said shank and blade being provided with interfitting flattened and bifurcated portions; a bolt extending through said portions and securing said blade and shank together; a pair of arms pivotally mounted on said bolt on opposite sides of said blade and having trailing portions for riding the surface of the soil behind said blade and covering the furrow formed thereby; and a pair of coil springs mounted on said bolt on opposite sides of said blade and engaging the later and said arms for individually urging said arms into engagement with the soil.

3. The structure defined in claim 2 including at least one lug on each of the arms engaged by one end of the corresponding spring, and a shearable second bolt extending through said portions to secure said blade and shank together against pivotal movement therebetween about the axis of said first-mentioned bolt, the other end of each of said springs being engaged with said second bolt.

4. The structure defined in claim 3 in which there are a series of the lugs arranged in spaced relation in an arcuate path about the axis of the first-mentioned bolt for selective engagement of the one end of the springs with the lugs of said series to change the spring force urging the arms against the soil.

5. A sealing arm of the type described comprising an elongated plate-like member, one end portion of said member having a bearing aperture therein and a boss on a side face of said portion surrounding said aperture, said member having a gradual 90° helical twist intermediate its length which disposes the other end portion of said member on the same side of the plane of the other side face of said one end portion as said boss.

References Cited in the file of this patent

UNITED STATES PATENTS

| | | |
|---|---|---|
| 221,004 | Strayer | Oct. 28, 1879 |
| 309,403 | Otstot | Dec. 16, 1884 |
| 323,953 | Outram | Aug. 11, 1885 |
| 335,468 | McLain | Feb. 2, 1886 |
| 358,209 | Lindgren | Feb. 22, 1887 |
| 404,108 | Patric et al. | May 28, 1889 |
| 490,833 | Muir | Jan. 31, 1893 |
| 515,046 | Campbell | Feb. 20, 1894 |
| 527,363 | Conkwright | Oct. 9, 1894 |
| 548,207 | Jones | Oct. 22, 1895 |
| 789,798 | Deterding | May 16, 1905 |
| 889,947 | Miller | June 9, 1908 |
| 909,137 | Bellerive | Jan. 12, 1909 |
| 1,002,344 | Watson | Sept. 5, 1911 |
| 1,006,116 | Morse | Oct. 17, 1911 |
| 1,202,562 | Mintern | Oct. 24, 1916 |
| 1,653,786 | Shell | Dec. 27, 1927 |
| 1,693,318 | Shell | Nov. 27, 1928 |
| 1,962,116 | Atwater | June 12, 1934 |
| 2,509,627 | Bickerton et al. | May 30, 1950 |

FOREIGN PATENTS

| | | |
|---|---|---|
| 23036/29 | Australia | Mar. 28, 1930 |
| 144,504 | France | Aug. 12, 1881 |
| 843,895 | France | Apr. 3, 1939 |

OTHER REFERENCES

Agricultural Engineering, Sept. 1947 (pages 394, 395, 396).